United States Patent
Stade et al.

(10) Patent No.: US 8,403,547 B2
(45) Date of Patent: Mar. 26, 2013

(54) LIGHT MODULE FOR A MOTOR VEHICLE

(75) Inventors: Florian Stade, Metzingen (DE); Doris Boebel, Stuttgart (DE); Michael Scholl, Gomaringen (DE)

(73) Assignee: Automotive Lighting Reutlingen GmbH (DE)

( * ) Notice: Subject to any disclaimer, the term of this patent is extended or adjusted under 35 U.S.C. 154(b) by 308 days.

(21) Appl. No.: 12/971,067

(22) Filed: Dec. 17, 2010

(65) Prior Publication Data

US 2011/0149584 A1 Jun. 23, 2011

(30) Foreign Application Priority Data

Dec. 22, 2009 (DE) .......................... 10 2009 060 792

(51) Int. Cl.
*F21V 17/02* (2006.01)
(52) U.S. Cl. ......... 362/512; 362/507; 362/538; 362/545
(58) Field of Classification Search .................. 362/247, 362/249.02, 276, 277, 296.01, 297, 319, 362/346, 347, 464, 507, 509, 512, 514, 517, 362/518, 538, 543–545
See application file for complete search history.

(56) References Cited

U.S. PATENT DOCUMENTS

| | | | | |
|---|---|---|---|---|
| 6,059,435 A * | 5/2000 | Hamm et al. | ................. | 362/514 |
| 6,527,424 B2 * | 3/2003 | Rosenhahn et al. | .......... | 362/513 |
| 6,719,444 B1 * | 4/2004 | Alber et al. | ..................... | 362/518 |
| 2004/0223338 A1 * | 11/2004 | Koike et al. | .................... | 362/545 |
| 2005/0068787 A1 | 3/2005 | Ishida | | |
| 2007/0086202 A1 | 4/2007 | Tsukamoto et al. | | |
| 2007/0171665 A1 | 7/2007 | Finch | | |
| 2008/0225544 A1 | 9/2008 | Fujiwara et al. | | |

FOREIGN PATENT DOCUMENTS

| | | |
|---|---|---|
| DE | 10224004 A1 | 12/2002 |
| DE | 102004017454 A1 | 1/2005 |
| DE | 102004047301 A1 | 4/2005 |
| DE | 102004046389 A1 | 4/2006 |
| DE | 102005058936 A1 | 7/2006 |
| DE | 102006057553 A1 | 6/2007 |
| DE | 102007024962 A1 | 12/2007 |
| DE | 102006043298 A1 | 3/2008 |
| DE | 102008009820 A1 | 9/2008 |
| EP | 2075500 A2 | 1/2009 |
| EP | 2085687 A2 | 8/2009 |

OTHER PUBLICATIONS

Apr. 5, 2012 European Examination Report for EP 10 19 2611.
Jan. 22, 2010 German Examination Report for DE 10 2009 060 792.7-54.

* cited by examiner

*Primary Examiner* — Hargobind S Sawhney
(74) *Attorney, Agent, or Firm* — Bliss McGlynn, P.C.

(57) ABSTRACT

A light module (5, 6) for lighting equipment (1) of a motor vehicle comprises a plurality of semiconductor light sources (8, 9) for emitting light, a plurality of reflection areas (10, 11) for reflecting the light and assigned to separate reflector-element sections (10, 11), and a plate-shaped separation element (7) onto which the reflector-element sections (10, 11) are movably fixed separate from one another, arranged between the reflection areas (10, 11), and onto which the light sources (8, 9) are mounted such that an emitting direction of the light sources (8, 9) is substantially perpendicular to an optical axis of the light module (5, 6). The reflector-element sections (10, 11) are adjusted by moving the reflector-element sections (10, 11) in relation to the light sources (8, 9).

10 Claims, 6 Drawing Sheets

LIGHT MODULE FOR A MOTOR VEHICLE

CROSS-REFERENCE TO RELATED APPLICATION

This application claims priority to and benefit of the filing date of German Patent Application 10 2009 060 792.7 entitled "Light Module for a Lighting Equipment as Well as a Lighting Equipment of a Motor Vehicle with Such a Light Module" and filed on Dec. 22, 2009.

BACKGROUND OF INVENTION

1. Field of Invention

The invention relates, generally, to a light module and, more specifically, to such a module employed with lighting equipment of a motor vehicle.

2. Description of Related Art

A light module of the related art is known from, e.g., DE 10 2008 009 820 A1. All reflection areas of the known light module are assigned to one combined reflector element. The reflection areas are designed in such a way that the light module produces a light distribution according to the regulations of the state or region for which the light module is destined. In line with this, the light distribution in North America has to conform to the "SAE" regulations and in Europe has to conform to the "ECE" regulations. These regulations determine, for example: the minimal and maximal "brightness" values within the light distribution; shape or extension of the light distribution; corresponding "light-distribution brightness" values in horizontal and vertical directions; and position, location, and course of a possibly existing light/dark boundary.

Generally, it is true that reflection areas designed for producing a light distribution according to the "ECE" regulations are not automatically suitable for producing a light distribution according to other regulations (e.g., the "SAE" regulations). Much rather, it generally is the case that to use the known light module to satisfy regulations other than those for which the light module was originally designed, the reflection areas, especially the corresponding reflection surfaces, have to be designed and constructed completely new. This, though, includes relatively much effort, long development time, and, as a result, fairly high costs.

Thus, there is a need in the related art for a light module for a motor vehicle that can be converted to produce a light distribution according to certain regulations in a simplest, most cost-effective, and fastest way. More specifically, there is a need in the related art for such a light module that can be converted from producing a light distribution according to, e.g., the "ECE" regulations to producing a light distribution according to, e.g., the "SAE" regulations or any other regulations in a simplest, most cost-effective, and fastest way.

SUMMARY OF INVENTION

The invention overcomes the disadvantages in the related art in a light module for lighting equipment of a motor vehicle. The light module includes a plurality of semiconductor light sources for emitting light, a plurality of reflection areas for reflecting the light and assigned to separate reflector-element sections, and a plate-shaped separation element onto which the reflector-element sections (10, 11) are movably fixed separate from one another, arranged between the reflection areas, and onto which the light sources are mounted such that an emitting direction of the light sources is substantially perpendicular to an optical axis of the light module. The reflector-element sections are adjusted by moving the reflector-element sections in relation to the light sources. The invention overcomes the disadvantages in the related art also in lighting equipment of a motor vehicle that includes the light module.

One advantage of the light module for a motor vehicle of the invention is that it can be converted to produce a light distribution according to certain regulations in a simplest, most cost-effective, and fastest way.

Another advantage of the light module for a motor vehicle of the invention is that it can be converted from producing a light distribution according to, e.g., the "ECE" regulations to producing a light distribution according to, e.g., the "SAE" regulations in a simplest, most cost-effective, and fastest way.

Another advantage of the light module for a motor vehicle of the invention is that it is possible to cut down on building components to design the light module most compactly and cost-effectively.

Another advantage of the light module for a motor vehicle of the invention is that it is possible to exchange individual components of the light module, especially individual reflector-element sections for other regulations, with other components that are suitable to fulfill the regulations while all the other components of the light module can be kept without any changes.

Another advantage of the light module for a motor vehicle of the invention is that it is possible to replace a reflector-element section that produces a form of a light/dark boundary according to an interpretation of the "ECE" regulations with another reflector-element section that produces a different form of the light/dark boundary on the side of the road, as stipulated in, e.g., the "SAE," Japanese, or other regulations.

Another advantage of the light module for a motor vehicle of the invention is that it is possible to keep the light sources arranged and mounted to the support element (and further components of the light module) unchanged.

Another advantage of the light module for a motor vehicle of the invention is that the reflector-element sections are mounted to the support element such that they can be detached to ensure a secure mounting and an easy replacement of the reflector-element sections.

Another advantage of the light module for a motor vehicle of the invention is that the reflector-element sections can be adjusted relative to the light sources, fastened to the support element in the adjusted position, and replaced quickly and easily with other suitable reflector-element sections when necessary and the replaced reflector-element sections can be adjusted relative to the corresponding light sources and fastened in the adjusted position.

Another advantage of the light module for a motor vehicle of the invention is that the reflector-element sections have a high heat resistance and good thermal conductivity, are particularly light and stable, and can be made quickly and cost-effectively and from a material different from that of which the support element is made to optimize the materials used.

Another advantage of the light module for a motor vehicle of the invention is that the screen element shields direct light from the light sources, a blinding of other traffic participants (especially those in the oncoming traffic or the traffic moving in front) is omitted, and the use of direct light can increase the efficiency of the system and light up areas in the immediate vicinity of the vehicle that cannot be reached by the reflection of the reflectors.

Another advantage of the light module for a motor vehicle of the invention is that a further signal function can be integrated into the light module without requiring any further construction space and one or more of the further light sources can be replaced with other light sources to fulfill certain regulations.

Another advantage of the light module for a motor vehicle of the invention is that it is possible to vary the form, brightness, and color of the "spot" light distribution; keep the remaining components of the light module substantially without any changes; and adapt the light module quickly, simply, and cost-effectively to any changing regulations and the light module quickly and cost-effectively for another kind of traffic (e.g., left-hand traffic instead of right-hand traffic).

Another advantage of the light module for a motor vehicle of the invention is that the outward appearance of the light module is improved and the light module is visible from the outside (when the light module is used as a light unit for motor vehicles).

Other objects, features, and advantages of the invention will be readily appreciated as the same becomes better understood while reading the subsequent description taken in conjunction with the accompanying drawings.

BRIEF DESCRIPTION OF EACH FIGURE OF DRAWING OF INVENTION

DETAILED DESCRIPTION OF EMBODIMENTS OF INVENTION

Figure 1:
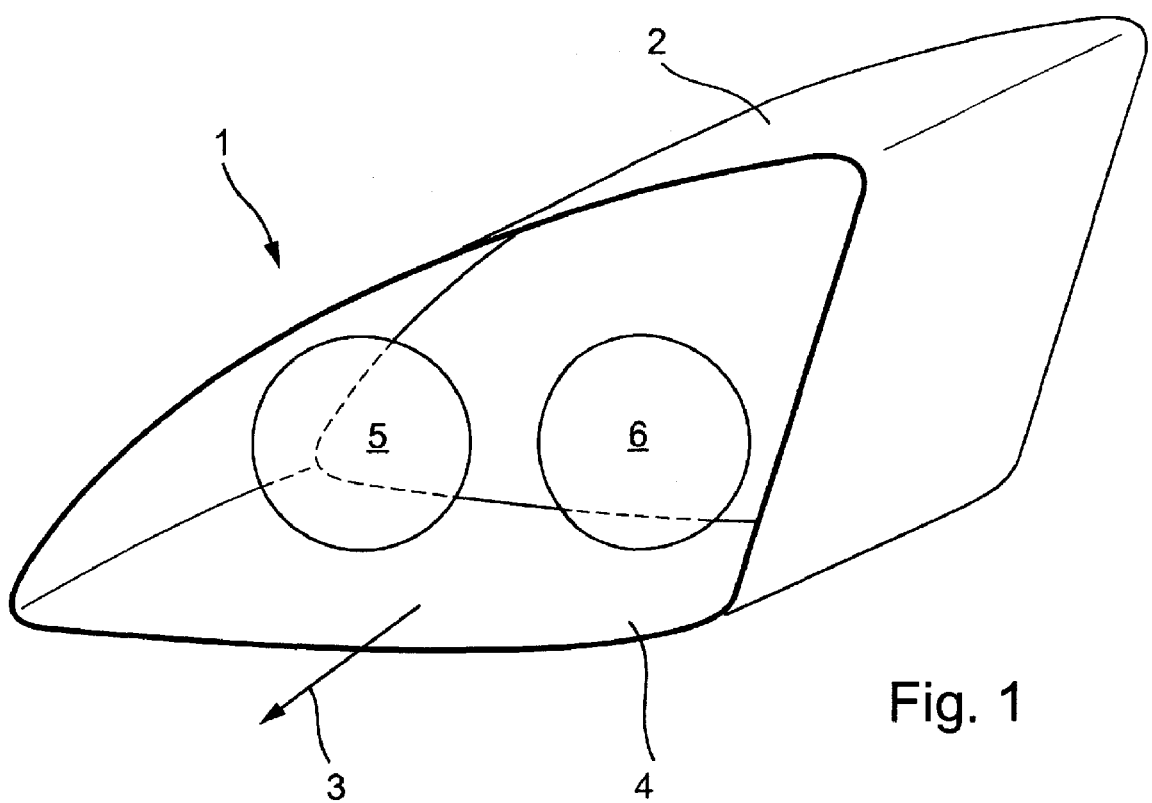
FIG. 1 is a perspective view of an embodiment of lighting equipment according to the invention.

Lighting equipment for motor vehicles according to an embodiment of the invention is generally indicated at 1 in FIG. 1. In the embodiment, the lighting equipment 1 is designed as a front headlight of a motor vehicle. It includes a housing 2 that, in an embodiment, is made of plastic. The housing 2 has a light-emitting opening in one light-emitting direction 3, which is closed by a transparent cover screen 4. The cover screen 4 protects the inside of the housing 2 as well as the headlight components arranged inside of the housing against moisture and dirt. The cover screen 4 can be designed as a so-called "clear screen" without any optically active profiles (e.g., prisms). As an alternative, the cover screen 4 can be designed at least partly with optically active prisms. The light modules 5, 6 are arranged on the inside of the headlight housing 2. The light modules 5, 6 are arranged in a fixed position or movable relative to the headlight housing 2.

Each of the light modules 5, 6 produces a desired light distribution—e.g., low beam, high beam, city, country road, highway, fog, daytime running, parking, or positioning. As an alternative, the two light modules 5, 6 are working together to produce the desired light distribution so that each of the two light modules 5, 6 produces a part of the desired total light distribution. The light modules 5, 6 can be designed as "reflection" modules or "projection" modules. In a "reflection" module, the light emitted from one or more of the light sources is being reflected by a reflector to produce the desired light distribution or part of the light distribution on the road in front of the motor vehicle. In a "projection" system, the reflected light from focusing optics—for example, a projection lens—is being projected onto the road, producing the desired light distribution or part of the light distribution. In case the desired light distribution includes a "light/dark" boundary, the "projection" system is designed with a screen arrangement between the reflector and projector lens, an upper edge of which is projected as a "light/dark" boundary onto the road in front of the motor vehicle.

Figure 2:
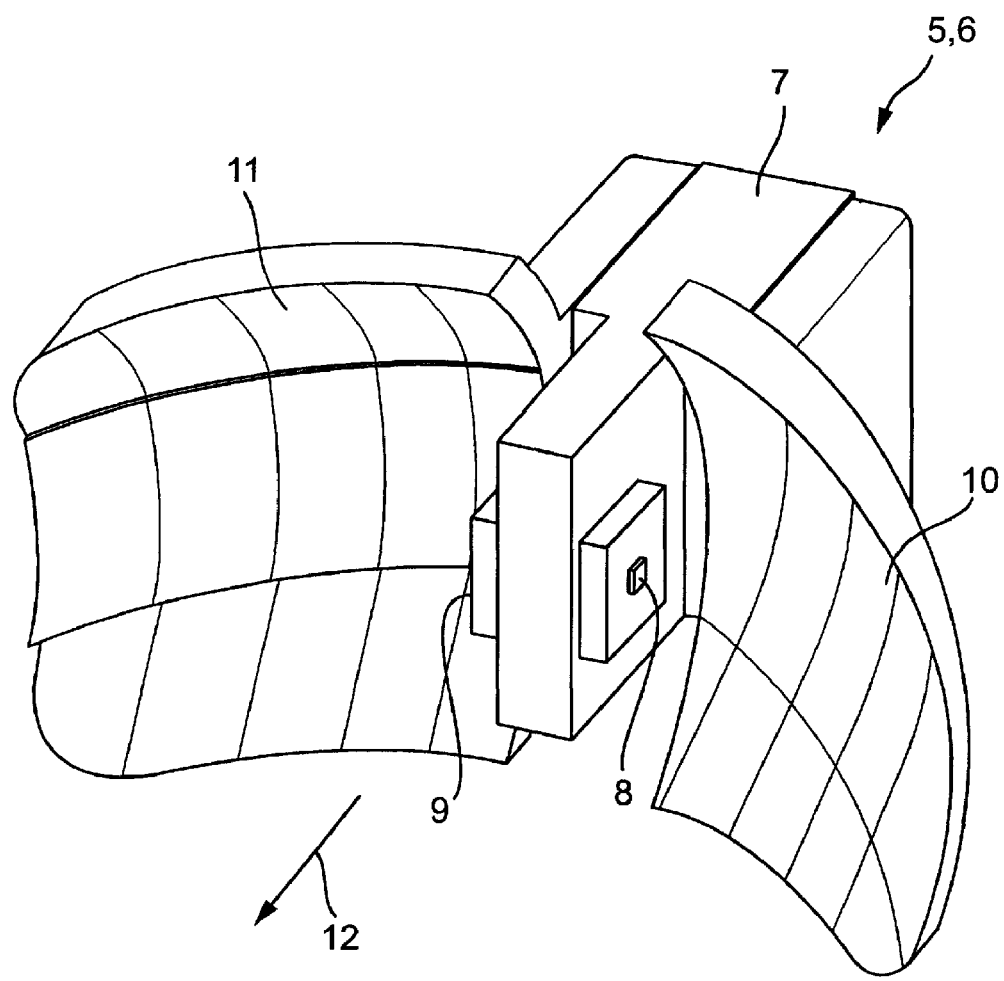
FIG. 2 is a perspective view of an embodiment of a light module according to the invention of the lighting equipment shown in FIG. 1.

As shown in FIG. 2, the light module, generally indicated at 5, 6, includes a plate-shaped separating element 7 that is forming a support element for the light modules 5, 6. The male components of the light module 5, 6 are arranged and mounted onto the support element 7. On the opposing sides right and left of the support element 7, semiconductor light sources 8, 9 are arranged. In the embodiment, "Philips Lumileds Luxeon Altilon" light-emitting diodes (LEDs) 8, 9 are used as the light sources. However, those having ordinary skill in the related art should appreciate that any other LEDs can be used. In the embodiment, the support element 7 is made of a material with good thermal conductivity—e.g., metal (such as aluminum-pressure die-casting). In this way, the head produced by the LEDs 8, 9 during operation can be dissipated to the environment very well. So, the support element 7 functions as a cooling element for the LEDs 8, 9 at the same time.

In both semi-spaces into which the LEDs 8, 9 emit light, reflection areas are assigned to separate reflector-element sections 10, 11. The LEDs 8, 9 are facing toward the direction of the reflection areas and fixed onto the support element 7. The reflector-element sections 10, 11 are designed as half-cup-shaped reflectors. The main light-emitting direction of the light sources 8, 9 is arranged mainly substantially perpendicular in relation to an optical axis 12 of the light module 5, 6. Both reflector-element sections 10, 11 are arranged and mounted on the support element 7 as well. In the embodiment, the reflector-element sections 10, 11 are arranged adjustable relative to the support element 7 so that the location and position of the reflection form-shapes of the reflector-element sections 10, 11 can be adjusted relative to the LEDs 8, 9 and then fixed in their adjusted position. For fixing the reflector-element sections 10, 11 onto the support element 7, removable connection elements are used (e.g., screws or the like). Those having ordinary skill in the related art should appreciate that the reflector-element sections 10, 11 can be fixed to the support element 7 by gluing, welding, clipping, or the like. The reflector-element sections 10, 11 can be made of a material with good thermal capacity as well—e.g., metal (such as metal-pressure die-casting). For reducing weight of the light module 5, 6, the reflector-element sections 10, 11 can be made out of plastic material, such as thermoset or duromer.

The reflection areas are not part of a single, combined reflector of the light module 5, 6. Rather, the reflection areas are assigned to separate reflector-element sections 10, 11 that are individually mounted in a detachable way to the support element 7. As such, the light module 5, 6 can be rearranged for producing a light distribution different than that originally planned in a simple, fast, and cost-effective way. In this way, it is possible that the light module 5, 6 can be adapted to changed regulations (e.g., the newest version of an "ECE" regulation), regulations binding in other countries (e.g., "SAE" regulations, "ECE" regulations, or corresponding Japanese regulations), and other kinds of traffic (e.g., "left hand" traffic or "right hand" traffic). For this, only a small part of the light module 5, 6 has to be replaced; the remaining parts of the light module 5, 6 can be carried over untouched. So, to conform to changed regulations or adapt the light module 5, 6 to a different kind of traffic, it is not necessary to change or reconstruct the entire light module 5, 6 new. Thus, the adapting of the light module 5, 6 can be achieved already by replacing one part or component or a few parts and/or components of the light module 5, 6.

In the embodiment and as shown in FIG. 2, exactly two half-cup-shaped reflector-element sections 10, 11 are arranged and mounted on opposing sides of the support element 7. One of the reflector-element sections 10 is designed to produce a substantially horizontally scattered light distribution (compare with FIG. 3), and the other reflector-element section 11 is designed for producing a converging light distribution (compare with FIG. 4).

Figure 3:
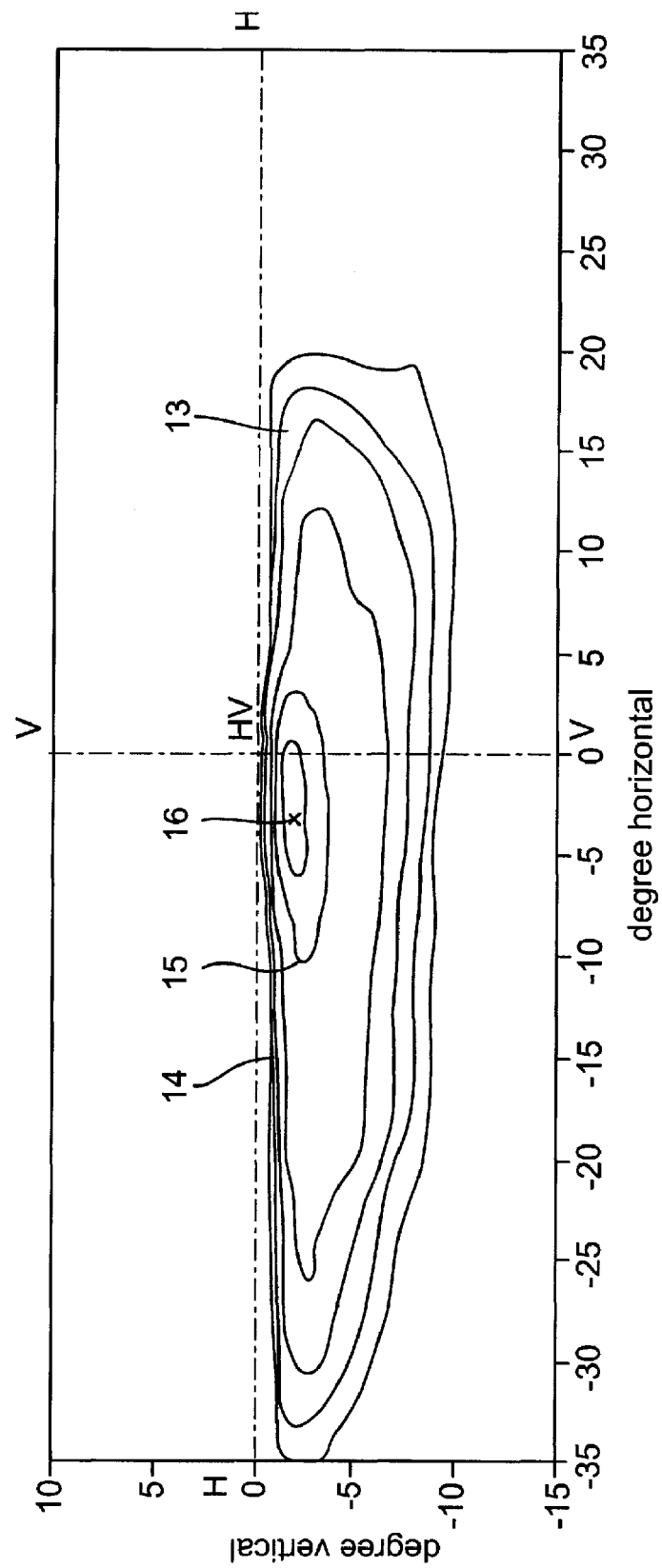
FIG. 3 is a graph illustrating a "basic" light distribution produced by a reflector-element section of the light module shown in FIG. 2.

FIG. 3 shows the light-distribution spread in a substantially horizontal direction 13 as displayed on a test screen set in front of the lighting equipment 1 of the motor vehicle. A horizontal axis "HH" and vertical axis "VV" are marked on the test screen. The juncture of the horizontal axis "HH" and vertical axis "VV" is labeled as "HV." The horizontally scattered light distribution 13 shown in FIG. 3 shows an upper "light/dark" boundary 14 with a substantially horizontal course. So-called "Isolux lines" 15 are marked on the inside of the light distribution 13 and highlight areas of the same light intensity. The strongest brightness occurs in the area 16 of the light distribution 13 that spreads in a substantially horizontal direction from about −5° to about 0° and in a substantially vertical direction from about −3° to about −1°. The basic light distribution 13 totally spreads in a substantially horizontal direction from about −35° to about +20° as well as in a substantially vertical direction from about −10° to about −1°. The basic light distribution 13 produced by the first reflector-element section 10 can, of course, also be created symmetrical in connection with the vertical axis "VV." Alternatively, it is possible that the basic light distribution 13 can deviate in its form, and the arrangement and amount of the brightness areas 15, 16 from the embodiment displayed can be deviated.

Figure 4:
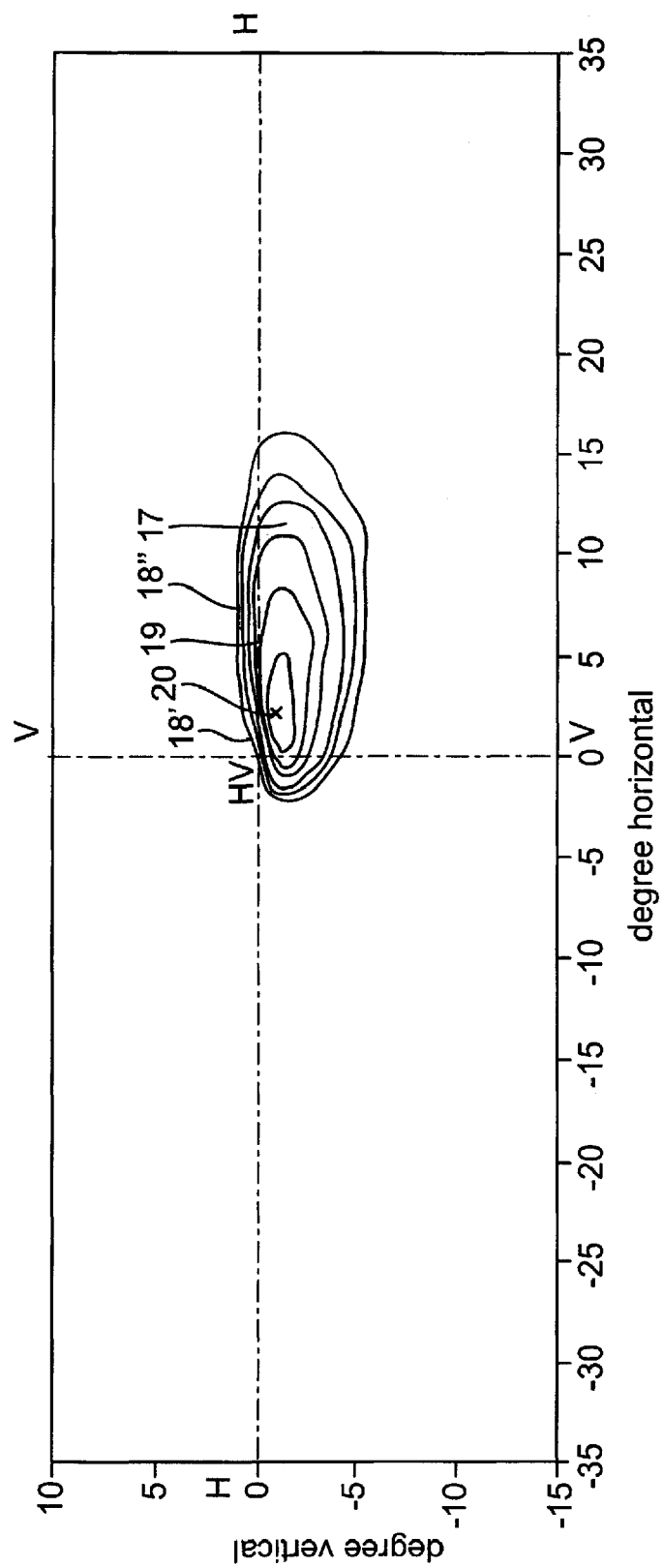
FIG. 4 is a graph illustrating a "spot" light distribution for right-hand traffic produced by one of the reflector-element sections of the light module shown in FIG. 2.

FIG. 4 shows the converging light distribution 17 of the other reflector-element section 11 as displayed on a test screen set in front of the lighting equipment 1. The "spot" light 17 also displays a "light/dark" boundary 18 that includes an ascending section 18' as well as a substantially horizontal section 18". Further, there are "Isolux" lines 19 marked in the "spot" light distribution 17 as well, which are areas with the same brightness values. Area 20 has the highest brightness in the light distribution 17. At the "spot" light distribution 17, area 20 stretches in a substantially horizontal direction from about 0° to about 5° and in a substantially vertical direction from about −2° to about just below 0°. The total stretch of the "spot" light distribution 17 runs in a substantially horizontal direction from about −2° to about +16° as well as in a substantially vertical direction from about −6° to about +1°.

The "spot" light distribution 17 includes a typical "light/dark" boundary 18 with an ascending section 18' of about 15°, as demanded in the "ECE" traffic sector. Headlights in the "SAE" traffic sector or according to the Japanese regulations generally produce a "light/dark" boundary with a different course than that. As regard to the basic light distribution 13, a light distribution can be used in the "ECE" traffic sector, "SAE" traffic sector, or other traffic sector with differing regulations as regard to light distribution.

Figure 5:
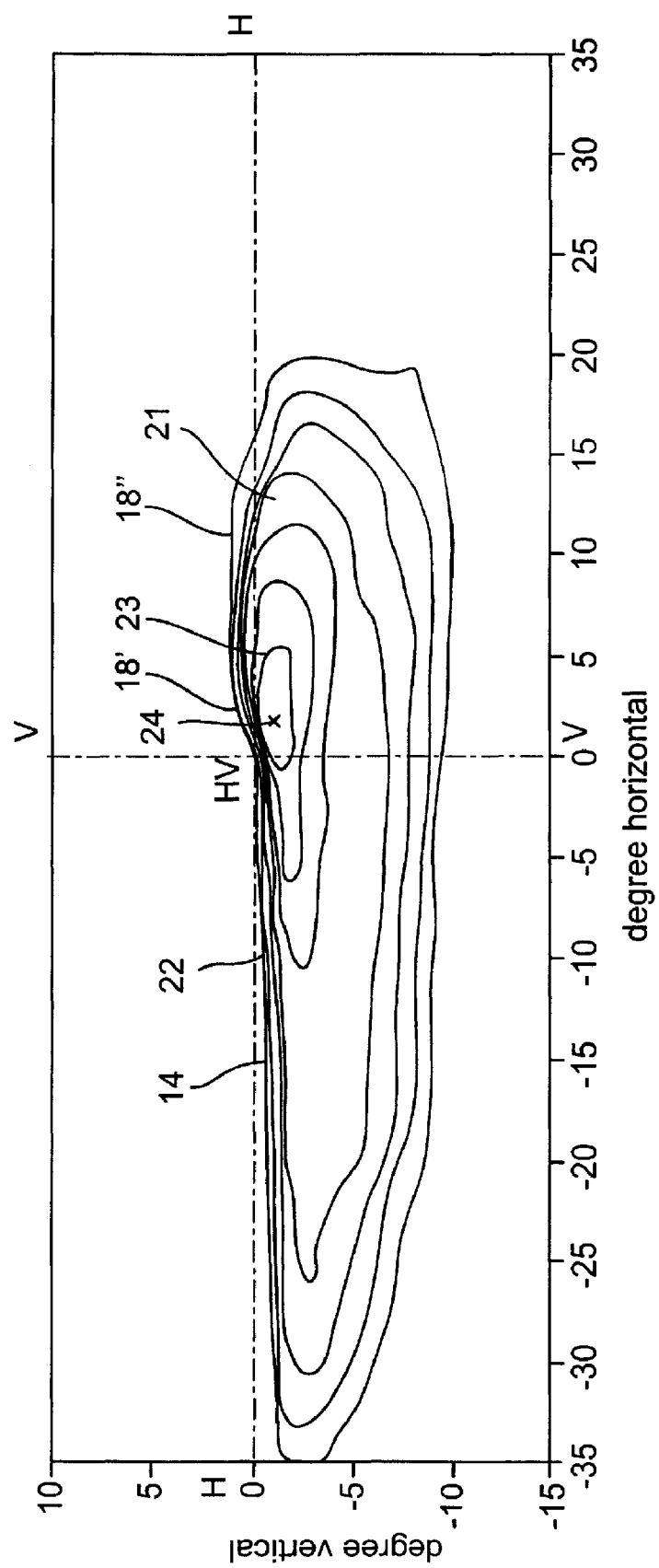
FIG. 5 is a graph illustrating a "low beam" light distribution produced by the light module shown in FIG. 2.

The overlaying of the basic light distribution 13 and "spot" light 17 results in a total light distribution 21 of the light module 5, 6 as shown in FIG. 5. The total light distribution 21 is displayed in a form on a test screen set in front of the lighting equipment 1. The light distribution 21 corresponds substantially to a "low beam" light distribution according to the "ECE" regulations. The light distribution includes a "light/dark" boundary 22 that is made-up of the horizontal section 14 of the basic light distribution 13, ascending section 18', and largely horizontal section 18" of the "spot" light distribution 17. Also, "Isolux" lines 23 are in the "low beam" light distribution 21. Area 24 has the highest brightness, is in a substantially horizontal direction between about −1° and about +5°, and stretches from about −3° to about just below 0° in a substantially vertical direction.

In case it is planned to use the light module 5, 6 in a different traffic sector with other regulations regarding the low-beam light than in the "ECE" traffic sector (such as regulations regarding the course of the upper "light/dark" boundary 22), the light module 5, 6 offers the possibility to simply replace the reflector-element section 11 (which is responsible for producing the "spot" light distribution 17 with a typical course of the "light/dark" boundary 18', 18" according to the "ECE" regulations) with another reflector-element section reflection form-shapes of which are created such that they produce a "spot" light distribution for the desired traffic sector. Thus, those having ordinary skill in the related art should appreciate, for example, that a changed reflector-element section produces a "spot" light distribution with an upper "light/dark" boundary having a cascaded transition between two substantially horizontal sections, as prescribed in the "SAE" regulations.

Figure 6:
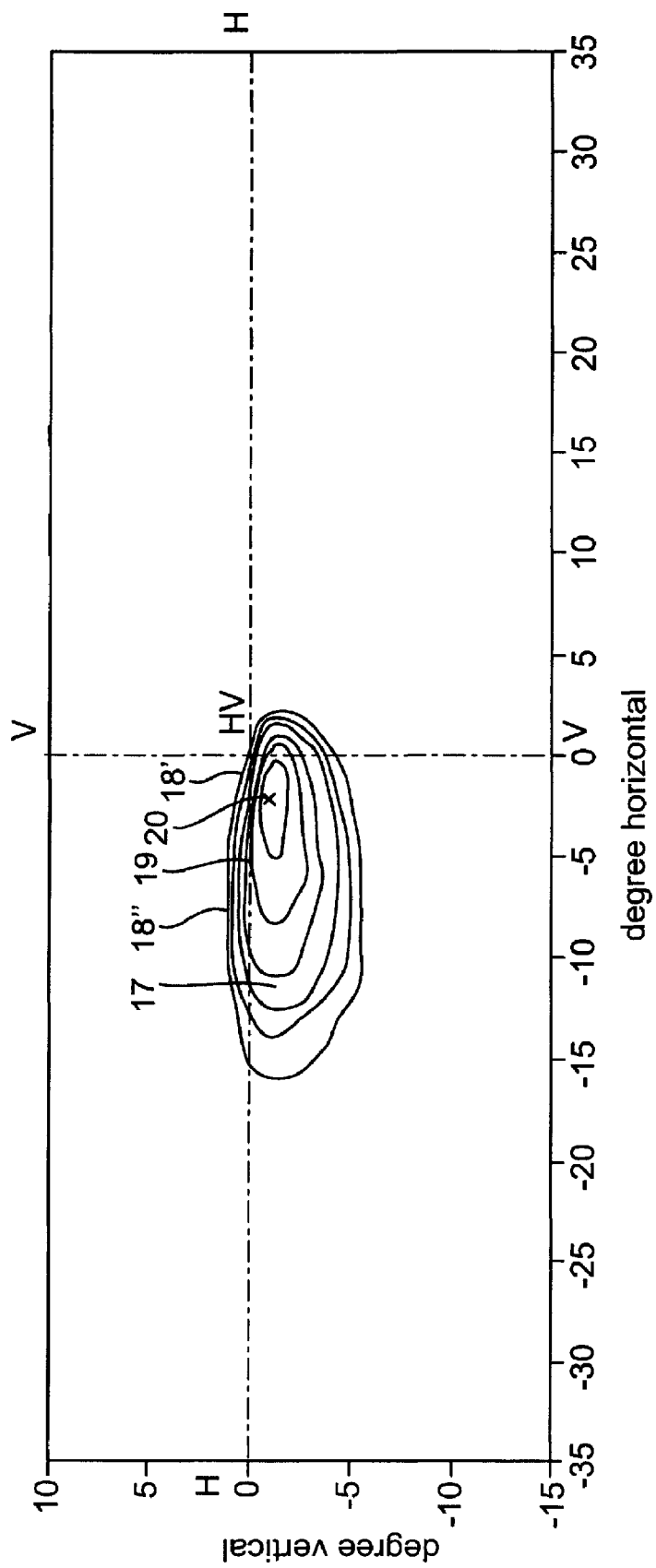
FIG. 6 is a graph illustrating a "spot" light distribution for left-hand traffic produced by one of the reflector-element sections of the light module shown in FIG. 2.

In another embodiment, if the light module 5, 6 has to be changed from, say, "right hand" traffic to another kind of traffic (such as "left hand" traffic), then it would be possible to simply and quickly replace the reflector-element section 11 (which is responsible for producing the light distribution 17 on the own side of the traffic) with another reflector-element section 11' (which produces a "spot" light distribution 17' for the own side of the traffic in "left hand" traffic). The corresponding "spot" light distribution 17' for "left hand" traffic is exemplified in FIG. 6 as displayed on a test screen set in front of the lighting equipment 1. The "spot" light distribution 17' includes an illuminated area above the horizontal axis "HH" on the left side—thus, the own side of the traffic in "left hand" traffic. An overlaying of the "spot" light distribution 17' for "left hand" traffic with the basic light distribution 13 produced by the reflector-element section 10 would lead to a basic light distribution 13, which would substantially correspond to the regulations for "left hand" traffic. In particular, an illumination above the horizontal axis "HH" on the other side of the traffic would be ruled out.

Of course, an optimal "low beam" light distribution for "left hand" traffic could be achieved if the reflector-element section 10 were replaced by another reflector-element section 10', which would produce a light distribution 13' that is a mirrored image of the light distribution 13 on the vertical axis "VV." Even in this case, the light module 5, 6 would still have definite advantages over known light modules since the support element 7 with the LEDs 8, 9 mounted on its sides and the entire electronics for power supply and control of the LEDs 8, 9 could be kept in untouched form. Further, it would be possible that the reflector-element section 10 would be shaped such that, instead of producing an asymmetrical light distribution 13 in regard to the vertical axis "VV," it would produce a substantially symmetrical light distribution in regard to the vertical axis "VV" and, thus, a mirror-image of the basic light distribution 13. In such a case, a simple replacement of the reflector-element section 11 could switch the light module 5, 6 for another kind of traffic (e.g., from "right hand" traffic to "left hand" traffic).

Viewed toward the light sources 8, 9 in the light-emitting direction (12) of the light module 5, 6, at least one screen element (not shown) can be arranged and mounted to the support element 7, which would prevent the light emitted by the LEDs 8, 9 to shine directly in the light-emitting direction 12 without first being reflected by one of the reflector-element sections 10, 11. By this, a blinding of other traffic participants by direct light can be prevented. Those having ordinary skill in the related art should appreciate that at least one further semiconductor light source is arranged and mounted onto at least one screen element on a side in the light-emitting direction [which, e.g., can be designed for producing a signal function (such as an indicator light, a daytime-running light, a city light, and/or a positioning light)]. If dimmed, the daytime-running light could also be used as a positioning light or parking light.

In the embodiment, the half-cup-shaped reflector elements 10, 11 have about the same focal distance. The number of light sources 9 that are assigned to the reflector-element section 11 for producing the converging light distribution 17, 17' is smaller than the number of light sources 8 that are assigned to the reflector-element section 10 for producing the scattered light distribution 13. When the light sources 8, 9 assigned to one of the reflector-element sections 10, 11 are arranged in such a way next to each other, their overall length is greater than their height or breadth and runs substantially parallel with the optical axis 12 of the light module 5, 6 or its light-emitting direction 12. To produce the basic light distribution 13, "1×4" or "1×5" LED-arrays can be used as light sources 8. To produce the "spot" light 17, 17', a "1×2" LED-array can be used as a light source 9. This means that the LED-array 8 for the basic light distribution 13 is longer than the LED-array 9 for the "spot" light 17, 17'.

Locating pins, for example, can position the reflector-element sections 10, 11 relative to the support element 7. Screwing, gluing, or clipping, for instance, can mount the reflector-element sections 10, 11 on the support element 7. The reflector-element sections 10, 11 can be made of plastic or aluminum-pressure die-casting. Also, the support element 7 can be made of metal, such as aluminum-pressure die-casting.

In the light module 5, 6, different LEDs can be used as light sources 8, 9. The LEDs 9 for producing the ascent 18' can have a smaller light-emitting area in comparison to the LEDs 8 for producing the basic light 13. This creates the opportunity to position the maximum 24 of the resulting light distribution 21 close to the ascent 18' in a substantially vertical direction, which results in a greater range. The LEDs 8 that generate a horizontal "light/dark" boundary 14 can include a larger light-emitting area. In an embodiment, the LEDs 8 include a stretched LED-array in a vehicle direction or light-emitting direction 12 similar to a longitudinal coil in a conventional halogen system. This makes it possible to create a sharp, substantially horizontal "light/dark" boundary 14 and a large side illumination The invention been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A light module (5, 6) for lighting equipment (1) of a motor vehicle comprising:
    a plurality of semiconductor light sources (8, 9) for emitting light;
    a plurality of reflection areas (10, 11) for reflecting said light and assigned to separate reflector-element sections (10, 11); and
    a plate-shaped separation element (7) onto which said reflector-element sections (10, 11) are movably fixed separate from one another, arranged between said reflection areas (10, 11), and onto which said light sources (8, 9) are mounted such that an emitting direction of said light sources (8, 9) is substantially perpendicular to an optical axis of said light module (5, 6), wherein said reflector-element sections (10, 11) are adjusted by moving said reflector-element sections (10, 11) in relation to said light sources (8, 9).

2. A light module (5, 6) as set forth in claim 1, wherein said reflector-element sections (10, 11) are substantially half-cup-shaped reflectors.

3. A light module (5, 6) as set forth in claim 2, wherein said substantially half-cup-shaped reflector-element sections (10, 11) define substantially equal focal distances with respect to each other.

4. A light module (5, 6) as set forth in claim 1, wherein said reflector-element sections (10, 11) are made of plastic material.

5. A light module (5, 6) as set forth in claim 4, wherein said reflector-element sections (10, 11) are thermoset.

6. A light module (5, 6) as set forth in claim 1, wherein said light module (5, 6) includes a pair of substantially half-cup-shaped reflector-element sections (10, 11) mounted on opposing sides of said support element (7), one of said reflector-element sections (11) produces a converging light distribution (17, 17'), and other of said reflector-element sections (10) produces a light distribution (13) scattered in a substantially horizontal direction.

7. Lighting equipment (1) of a motor vehicle comprising:
    at least one light module including:
        a plurality of semiconductor light sources (8, 9) for emitting light;
        a plurality of reflection areas (10, 11) for reflecting said light and assigned to separate reflector-element sections (10, 11); and
        a plate-shaped separation element (7) onto which said reflector-element sections (10, 11) are movably fixed separate from one another, arranged between said reflection areas (10, 11), and onto which said light sources (8, 9) are mounted such that an emitting direction of said light sources (8, 9) is substantially perpendicular to an optical axis of said light module (5, 6), wherein said reflector-element sections (10, 11) are adjusted by moving said reflector-element sections (10, 11) in relation to said light sources (8, 9).

8. Lighting equipment (1) of a motor vehicle as set forth in claim 7, wherein said reflector-element sections (10, 11) are substantially half-cup-shaped reflectors.

9. Lighting equipment (1) of a motor vehicle as set forth in claim 7, wherein said reflector-element sections (10, 11) are made of plastic material.

10. Lighting equipment (1) of a motor vehicle as set forth in claim 1, wherein said light module (5, 6) includes a pair of substantially half-cup-shaped reflector-element sections (10, 11) mounted on opposing sides of said support element (7), one of said reflector-element sections (11) produces a converging light distribution (17, 17'), and other of said reflector-element sections (10) produces a light distribution (13) scattered in a substantially horizontal direction.

* * * * *